April 20, 1943.  A. W. LEMMON  2,317,235
TAKE-UP MECHANISM FOR CONVEYER APPARATUS
Filed Nov. 15, 1941
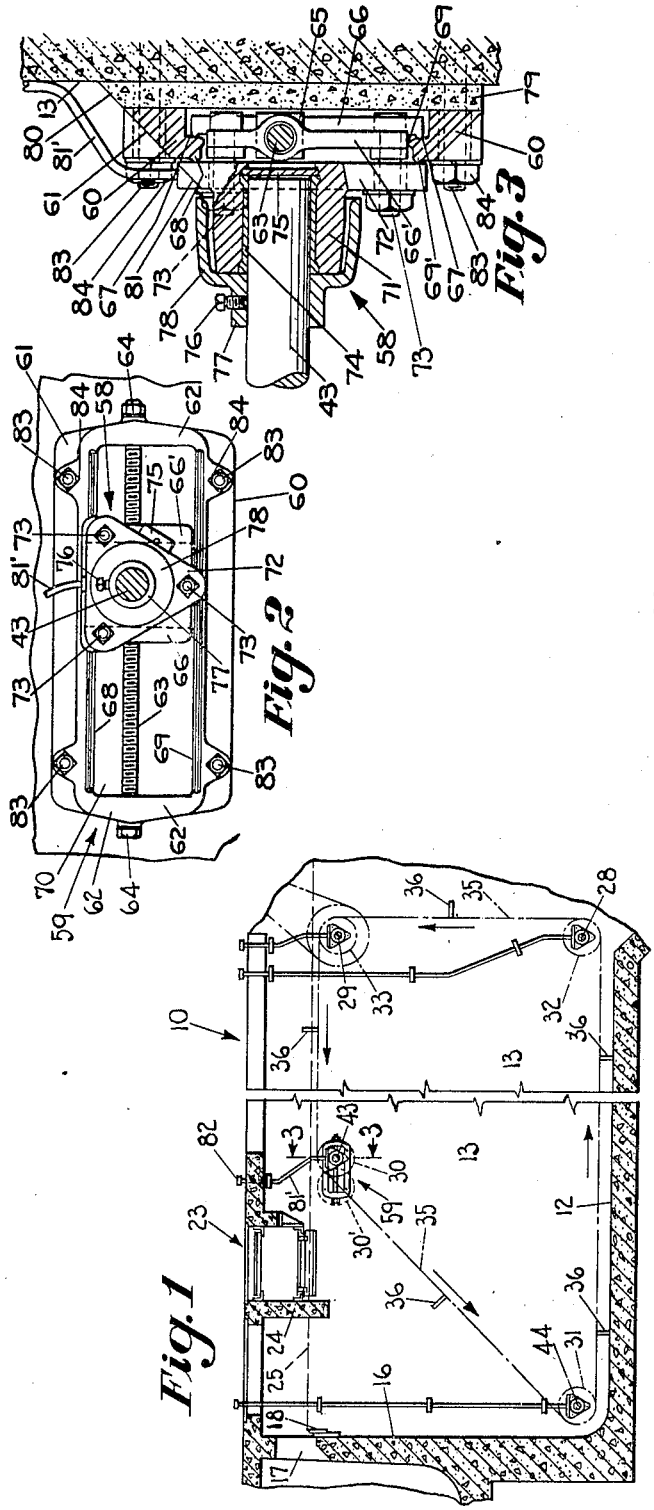
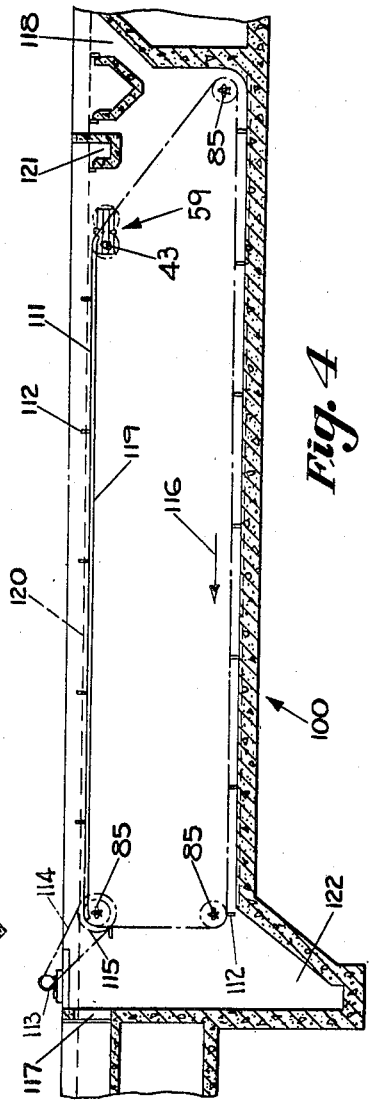
INVENTOR:
ALEXIS W. LEMMON,
BY Chas. M. Nissen,
ATTY.

Patented Apr. 20, 1943

2,317,235

UNITED STATES PATENT OFFICE 2,317,235

TAKE-UP MECHANISM FOR CONVEYER APPARATUS

Alexis W. Lemmon, Columbus, Ohio, assignor to The Jeffrey Manufacturing Company, a corporation of Ohio Application November 15, 1941, Serial No. 419,355

17 Claims. (Cl. 74—242.14)

This invention relates to take-up mechanism for conveyer apparatus particularly adapted for use in sewage disposal plants, and one of the objects of the invention is the provision of improved take-up mechanism adapted to be mounted on the inner walls of a sedimentation tank in such a manner as to reduce the collection of sediment on conveyer shaft bearings to a minimum.

Another object of the invention is the provision of inclined sediment shedding surfaces on take-up mechanism for conveyer shaft bearings at the inner opposing walls of a sedimentation tank.

A further object of the invention is an improved method of assembly of take-up mechanism for conveyer shafts and the mounting of the take-up mechanism on the inner opposing walls of a sedimentation tank in accordance with the lengths of the conveyer shafts.

Other objects of the invention will appear hereinafter, the novel features and combinations being set forth in the appended claims.

In the accompanying drawing,

Fig. 1 is a longitudinal vertical sectional view of a portion of a sedimentation tank for sewage disposal apparatus comprising my invention;

Fig. 2 is an enlarged elevational view of the chain tensioning or take-up mechanism included in the conveyer apparatus comprising my invention;

Fig. 3 is an enlarged sectional view taken on the line 3—3 of Fig. 1 looking in the direction of the arrows; and Fig. 4 is a longitudinal vertical sectional view of another form of sedimentation tank for sewage disposal apparatus to which my invention is adapted.

This application is a continuation-in-part of my co-pending application, Serial No. 188,963, filed Feb. 5, 1938, for an improvement in Sewage disposal apparatus, now Patent No. 2,291,641, granted August 4, 1942.

This application is also a continuation in part of my co-pending application S. N. 375,962, filed Jan. 25, 1941, for an improvement in Take-up mechanism for conveyer apparatus, now Patent No. 2,291,733, granted Aug. 4, 1942, and including generic claims covering two forms of the invention, whereas the claims hereto appended are limited to the form of invention shown in Figs. 2 and 3.

Referring particularly to Fig. 1 of the drawing, there is illustrated a portion of a sedimentation tank 10 which may be formed as a monolith of poured concrete comprising opposite inner vertical side walls 13 and bottom 12. Adjacent the effluent end of the tank 10 is the end wall 16 provided with an effluent opening 17 adjacent which is a vertically adjustable liquid level controlling weir 18.

Within the sedimentation tank 10 I provide conveyer apparatus adapted to convey settled sludge by its lower run toward the right as viewed in Fig. 1, and to convey floating scum by its upper run to a cross-scum collector or scum conveyer 23 which co-operates with a baffle 24 extending below the normal liquid level in the sedimentation tank 10, as indicated by the line 25, to insure a complete collection of the scum. The scum conveyer 23 conveys the accumulated scum by positive rectilinear motion up an inclined chute leading to a scum trough.

As shown in Fig. 1, the conveyer apparatus comprises idler shafts 43, 44 which carry intermediate their ends spaced-apart sprockets 30, 31, over which are reeved spaced conveyer chains 35 carrying transversely extending wooden flights 36, 36.

The opposite ends of the idler shafts 43, 44 are supported from the opposing vertical inner faces of the walls 13, 13 of the sedimentation tank by similar bearings 58, the structure of which is shown in Fig. 3, and described and claimed in my co-pending application, S. N. 188,963, filed Feb. 5, 1938, for an improvement in Sewage disposal apparatus, now Patent No. 2,291,641, granted August 4, 1942.

The idler shaft 43 is supported upon improved chain tensioning take-up apparatus 59, the structure of which will be described more fully hereinafter. It may be mentioned, however, that said chain tensioning apparatus 59 provides for the maintenance of the chains 35 in proper tension by adjustment of the sprocket 30 from the operating position illustrated in Fig. 1 of the drawing, to the dotted line position 30' there illustrated.

Near the influent or right-hand end of the sedimentation tank 10, a motor is connected to the driving shaft carrying spaced-apart sprockets 33 meshing with the spaced-apart chains 35. Below the driving shaft is another idler shaft 28 carrying sprockets 32 with which the spaced chains 35 mesh so as to guide the flights 36 along the bottom 12 of the sedimentation tank.

Referring to Figs. 1, 2 and 3 of the drawing, it will be seen that the chain tensioning devices 59 which are provided at each end of the idler shaft 43, include a bearing construction 58. The chain tensioning device 59 comprises a wall bracket in the form of a recessed base plate 60 having a downwardly and inwardly sloping or beveled upper surface 61 for the purpose of shedding sediment. The wall bracket 60 comprises spaced-apart parallel guiding devices connected at their ends by a pair of vertical end pieces 62, 62 in which are journaled the ends of an adjusting screw 63 to support the latter for rotation. Nuts 64, 64 are connected to the ends of the screw 63 by means of cotter pins to prevent the screw 63 from being released from its journal bearings in the vertical end connecting pieces 62, 62.

The adjusting screw 63 is therefore mounted for free rotation and held by means of the nuts 64, 64 against longitudinal movement relatively to the base plate 60. The adjusting screw 63 is threaded through a nut 65 carried by the back plate 66, the front upper and lower edges of which are adapted to slide along the inner elongated guideways 67, 67 of the base plate 60. The surfaces of the guideways 67, 67 face rearwardly.

The back plate 66 is an integral casting having lateral extensions 66', 66', forming a supplemental plate. The back portion of the casting is rectangular in shape as indicated by the dotted lines in Fig. 2, and the vertical dimension of such rectangular portion is greater than the opening between the upper and lower edges 68, 69 of the rectangular opening 70 in the base plate 60. The front portion 66', however, may extend into the opening between the edges 68, 69, as shown in Fig. 3. The lower edge of the portion 66' is therefore adapted to ride along the double beveled guideway 69' as shown in Fig. 3. This arrangement necessitates the casting 66 being inserted into the position shown in Fig. 3 from the rear side of the base plate 60.

The journal bearing 71 shown in section in Fig. 3 has integral therewith the supporting plate 72 which is triangular in shape as shown in Fig. 2.

The three corners of the triangular plate 72 are provided with openings for receiving the bolts 73 which also pass through openings in the lateral extensions 66' of the casting 66, as shown in Fig. 3. Therefore by means of the bolts 73 the triangular plate 72 may be supported by the casting 66 to occupy a position in front of the upper and lower edges 68 and 69 of the opening 70 in the base plate 60. The bolts 73 act as clamps for holding the casting 66 in the position shown in Fig. 3, with the lower edge of the front portion 66' resting on the guideway 69, while the upper and lower edges of the back portion of said casting 66 are in engagement with the guideways 67, 67. The backs of the upper and lower edges of the triangular plate 72 ride along the upper and lower double beveled edges 68 and 69'.

It should be understood, however, that the bolts 73 serve as adjusting devices because they are adapted to be released when the screw 63 is to be turned in the nut 65 to shift the journal bearing 71 along the base plate 60 in one direction or the other. After adjustment of the journal bearing 71 has been made, the bolts may be re-tightened to clamp the journal bearings 71 securely in adjusted position relative to the base plate 60.

While it is not necessary to clamp the plate 72 to the guideways 67, 67, it is advisable to do so as this will take some of the load off the take-up screws 63 and its connections to the wall bracket. Furthermore, it is desirable to let the lower edge of the plate 66' rest on the guideway 69 so that the weight of the plate 66' and the parts carried thereby will be taken off the screw 63.

The journal bearing 71 may be provided with a bushing 74, as shown in Fig. 3, and a thrust bearing cross-plate 75 may be inserted in the journal bearing supporting plate 72 at the inner end of the bushing 74, as shown in Fig. 3, to prevent entrance of foreign material or sediment to the bushing 74; the plate 75 also serves to limit movement of the shaft 43 toward the right as viewed in Fig. 3. Suitable slots may be provided in the plate 72 for receiving the cross-plate 75.

Secured to the shaft 43 by means of the set screw 76 is a hub 77 carrying a cup-shaped shield 78 for surrounding and covering the journal bearing 71 to prevent the accumulation of any sediment on the latter. The journal bearing 71 is stationary while the cup-shaped shield 78 rotates with the shaft 43 during operation of the conveyer apparatus.

With the set screw 76 and the nuts on the bolts 73 released and the cross-plate 75 removed, the journal bearing 71 may be slid along the shaft 43. The casting 66 may be inserted from the back side of the base plate 60 and then the plate 72 may be bolted by means of the bolts 73 to the casting 66, with the base plate 60 connected to both the casting 66 and the plate 72. After re-insertion of the thrust bearing plate 75, the proper position of the journal bearing 71 may readily be determined and while held in a desired position the grouting 79 may be poured between the base plate 60 and the vertical inner wall 13 of the sedimentation tank. The upper end of the grouting is preferably beveled or sloped downwardly and inwardly as illustrated at 80 in Fig. 3, in alinement with the downwardly and inwardly upper sloping surface 61 of the base plate 60. The upper edge of the plate 72 may likewise be beveled or sloped downwardly and inwardly at 81 in alinement with the sloping surfaces 61 and 80. These alined sloping surfaces are for the purpose of shedding sediment toward the rotatable shield 78 which will by its rotary motion prevent such sediment from accumulating on top of the stationary journal bearing 71.

Extending upwardly through the plate 72 from the interior of the bushing 74 is a lubrication conduit to which is connected the upwardly extending pipe 81'. This is a high pressure lubrication conduit provided with a high pressure fitting 82 adjacent the top of the tank 10 to the end that the journal bearing may be lubricated at any time. The pipe 81' is flexible so as not to interfere with the adjustment of the sprocket 30 from its full line position to its dotted line position 30' shown in Fig. 1.

The base plate 60 is provided with openings to receive the stub bolts 83, 83 which are anchored in the concrete of the vertical wall 13 of the sedimentation tank. By means of nuts 84, 84, the base plate 60 may be secured to the anchor bolts 83. It will thus be seen that the grouting 79 may become firmly attached to the inner wall 13 of the tank but that the base plate 60 may be detached by removing the nuts 84 and drawing the plate 60 away from the bolts 83. This may readily be done after the cross-plate 75 has been removed, the set screw 76 released, and the journal bearing 71 slid along the shaft 43 after the bolts 73 have been released. In other words, by removing the journal bearing 71 and the shaft 43, the plate 60 may be detached from the grouting 79 and the wall 13. It should be understood that this may be desirable when a worn nut 65 is to be renewed, since the casting 66 must be inserted from the rear side of the base plate 60 and can not be inserted in place through the opening 70 from the front side of the base plate 60.

Referring to Fig. 4 it will be seen that the shafts 43 and 85 carry spaced-apart sprockets which mesh with spaced-apart chains to which are attached transverse conveyer flights 112. A motor 113 is connected by a sprocket chain 114 to a sprocket 115 so as to secure operation of the endless conveyer apparatus in the direction of the arrow 116. The sewage enters at the influent opening 117 for flow through the tank 100 toward the right as viewed in Fig. 4, to the effluent opening 118. The upper run of the conveyer 111 moves along the guideway 119 so that the scum floating on the liquid surface 120 will be moved toward the right for flow into the scum trough 121. The lower run of the conveyer 111 moves in the direction of the arrow 116 to cause the flights 112 to scrape the sludge from the bottom of the tank into the sump 122. The ends of the shafts 85 are supported and journaled in housings secured to opposite vertical walls of the tank.

In Fig. 1 the shaft 43 is near the effluent 17 and in Fig. 4 the shaft 43 is located near the effluent 118, but in the two views the take-up devices are located on opposite walls. That is to say, in both the arrangement shown in Fig. 1 and the arrangement shown in Fig. 4 the take-up devices 59 are mounted on opposite walls directly across the tank from each other. The nuts 64 are preferably simultaneously operated from opposite sides of the tank to rotate the screws 63, when the slacks in the conveyer chains are to be adjusted.

As shown in Fig. 3, the front journal bearing supporting plate 72 is spaced a short distance from the back plate 66 so that when the nuts on the bolts 73 are loosened, the edges of the plates 72 and 66 will be free to slide along the elongated front guides 68, 69' and the elongated rear guides 67, 67 while the bottom of the inner or rear plate 66 rests for support on the guide 69. After adjustment of the shaft 43 has been made, the nuts on the bolts 73 may be retightened to clamp the plates 66, 72 to the guides 67, 68, 69', with the bottom of the plate 66 still supported on the guide 69. With this arrangement the screw 63 always remains loosely threaded through the nut 65 thereby enabling the operator with minimum effort to turn the nuts 64 to effect rotation of the screws 63 at opposite sides of the tank 10 or tank 100. Moreover, after the plates 66, 72 have been clamped to the wall bracket 60 by tightening the nuts on the bolts 73, the stresses and strains on the shaft 43 during operation of conveyer apparatus in the tank is distributed between the guides 67, 68, 69' and the screws 63, thereby reducing the wear on the threads of the screws 63.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Take-up mechanism comprising the combination with a wall bracket having an elongated rectangular opening therethrough, of a supporting plate having opposite parallel edges guided along elongated surfaces facing toward the back of the wall bracket, a front plate spanning said opening and engaging the front edges of the opening opposite the said rear elongated guiding surfaces, a journal bearing carried by said front plate, bolts for detachably securing said front plate to said supporting plate to clamp the front plate in position to move bodily with said supporting plate and form an interlocking guiding connection between said bracket and said plates, and mechanism comprising a screw-threaded rod journalled in said wall bracket and extending through said supporting plate for moving the plates along said opening to effect adjustment of said journal bearing.

2. Take-up mechanism comprising the combination with a wall bracket having rear inner elongated parallel guiding surfaces, of a supporting plate having opposite parallel edges slidable along said guiding surfaces, a front plate spanning the space between front edges of said wall bracket opposite said rear elongated guiding surfaces, a journal bearing carried by said front plate, mechanism for connecting said front plate to said supporting plate to clamp the front plate in position to move bodily with said supporting plate and form an interlocking guiding connection between said bracket and said plates, and mechanism comprising a screw-threaded rod extending through said supporting plate for moving the plates along said wall bracket to effect adjustment of the said journal bearing.

3. Take-up mechanism comprising the combination with spaced-apart guiding devices each having parallel front and rear guiding surfaces, of a supporting plate with opposite parallel edges adapted to slide along the rear parallel spaced-apart guiding surfaces, a journal bearing, a support for said journal bearing slidable along the front parallel spaced-apart guiding surfaces, means for securing said journal bearing support to said supporting plate to move bodily therewith, and means comprising a screw supported on journal bearings and threaded through a nut carried by said supporting plate to effect movement of the journal bearing along said guiding devices upon rotation of said screw.

4. Take-up mechanism comprising the combination with spaced-apart guiding devices each having front and rear guiding surfaces, of a supporting plate having opposite parallel edges guided along the rear guiding surfaces of said guiding devices, a front plate slidable along the front guiding surfaces of said guiding devices, a journal bearing carried by said front plate, mechanism for detachably connecting said front plate to said supporting plate to mount the front plate in position to move bodily with said supporting plate and form an interlocking guiding connection between said guiding devices and said plates, and mechanism comprising a screw-threaded rod supported by journal bearings and associated with said plates to confine the latter to predetermined positions relative to said guiding devices and to effect movement of said plates along said guiding surfaces when said screw-threaded rod is rotated.

5. Take-up mechanism comprising the combination with a relatively thin and flat wall bracket having parallel vertically spaced-apart guiding surfaces at the edges of an opening in said bracket, of a vertical supporting plate having vertically spaced-apart opposite edges slidable along said guiding surfaces within the confines of said wall bracket, a journal bearing, spaced-apart bolts for detachably securing said journal bearing to said supporting plate, and means comprising a screw-threaded rod threaded through said supporting plate for moving the latter along said guiding surfaces to adjust the position of the axis of said journal bearing in a horizontal plane.

6. Take-up mechanism comprising a wall bracket, a journal bearing, a support for said journal bearing comprising a plate adapted to slide along front parallel spaced-apart guides on said bracket, mechanism adapted to secure said bracket to an upright wall, a supplemental supporting plate fitting between opposed parallel additional spaced-apart guides in a plane intermediate said first-named guides and the rear of said wall bracket, a rotatable screw threaded through said supplemental supporting plate for moving the latter along said bracket, a back plate with its upper and lower edges in engagement with rearwardly facing guides in said wall bracket, and mechanism securing said back plate and said supplemental plate to said first-named plate to effect interlocking guiding mechanism between said journal bearing support and said wall bracket.

7. Take-up mechanism comprising the combination with a wall bracket having an elongated rectangular opening therethrough, of a supporting plate with opposite parallel edges adapted to slide along parallel spaced-apart guiding surfaces at the rear of opposite edges of said opening in said bracket, means for anchoring said wall bracket to a wall with said supporting plate closely adjacent thereto, a journal bearing support slidable along edges at the front of said wall bracket directly opposite the aforesaid parallel spaced-apart rear guiding surfaces, extensions from said supporting plate in position to slide along a lower edge of said opening, means for detachably securing said journal bearing support to said supporting plate to move bodily therewith and with said extensions, and means comprising a screw threaded through said slidable securing means and journaled to said wall bracket to move the journal bearing support along said opening to effect adjustment thereof.

8. Take-up mechanism comprising a shallow wall bracket having a top surface beveled downwardly toward its front face, a journal bearing support at right angles to said shallow wall bracket and comprising an upright plate movable along said front face and having a top surface beveled, said beveled surfaces both being inclined downwardly away from the upright wall on which said wall bracket is mounted, mechanism for interlocking said plate with said wall bracket while supporting said journal bearing support on said wall bracket and holding said beveled surfaces in the same plane, and means for moving said journal bearing support along said bracket while said beveled surfaces are held in the same plane.

9. Take-up mechanism comprising a shallow wall bracket having an upper beveled surface, a journal bearing support at right angles to said bracket and comprising a vertical plate having an upper beveled surface, means comprising grouting for mounting said bracket on an upright wall with the upper surface of the grouting beveled, mechanism interlocking said journal bearing to said wall bracket while permitting sliding movement along the same, and means for effecting adjustment of the journal bearing support along said bracket, the construction and arrangement being such that said beveled surfaces are always approximately in the same inclined plane extending downwardly away from such wall, the upper beveled surface of said plate being confined to such inclined plane by said interlocking mechanism.

10. Take-up mechanism comprising a shallow wall bracket having vertically spaced horizontal parallel front and rear and intermediate guides connected at their ends by vertical cross-pieces integral with said guides, a journal bearing support comprising a vertical plate slidable along said front guides, interlocking mechanism comprising a back plate slidable along said rear guides, extensions from said back plate slidable along said intermediate guides, means comprising a screw threaded through said back plate and journaled at its end portions in said integral cross-pieces, said front and rear plates together with said extensions being confined by said screw to slide along said guides, and means for anchoring said bracket to an upright wall with said guides in vertical planes closely adjacent to said wall with the journal bearing limited in its adjustments along said guides by said cross-pieces serving as abutments.

11. Take-up mechanism comprising the combination with parallel spaced-apart guides each having rear inner parallel spaced-apart guiding surfaces and front parallel guiding surfaces, of a supporting plate with opposite parallel spaced-apart edges adapted to slide along the said rear guiding surfaces, a journal bearing support slidable along said front guiding surfaces, means comprising a screw-threaded rod connected to said plate and to said journal bearing support to carry both in predetermined relation to said guides and for movement along the latter to effect adjustment of the journal bearing support, and mechanism for detachably connecting said journal bearing support to said supporting plate to move bodily therewith.

12. Take-up mechanism comprising parallel spaced-apart guiding devices the upper one having a top surface beveled downwardly toward its front face, a journal bearing support comprising an upright plate movable along said front face and having a beveled top surface, said beveled surfaces both being inclined downwardly away from the upright wall on which said guiding devices are mounted, means for securing said guiding devices to an upright mine wall, a back plate having its upper and lower opposite edges slidable along rear guiding surfaces of said guiding devices, extensions from said back plate slidable along intermediate guiding surfaces of said guiding devices, mechanism connecting said plates together to move bodily with said journal bearing support, and means comprising a rotatable screw threaded through said back plate for moving said journal bearing support along said guiding devices while holding the said beveled surfaces always in the same inclined plane.

13. Take-up mechanism comprising spaced-apart guiding devices the upper one having an upper beveled surface, each of said guiding devices having front and rear and intermediate guiding surfaces, a journal bearing support comprising a vertical plate having an upper beveled surface, said plate being slidable along the front guiding surfaces, means comprising grouting for mounting said guiding devices on an upright mine wall with the upper surface of the grouting beveled, the beveled surfaces of the grouting and of the upper guiding device being in the same inclined plane extending downwardly away from such upright wall, a back plate slidable along the said rear guiding surfaces, extensions from said back plate slidable along said intermediate guiding surfaces, mechanism securing all of said plates together to move bodily with said journal bearing support, and mechanism for effecting movement of said journal bearing support along said guiding devices while holding the plate of the journal bearing support with its upper beveled surface in the inclined plane extending through the other beveled surfaces.

14. Take-up mechanism comprising parallel vertically spaced-apart guiding devices each having an inner rear guiding surface and an outer guiding surface and an intermediate guiding surface, a journal bearing, interlocking mechanism between said guiding surfaces and said journal bearing, a rotatable screw threaded entirely through said interlocking mechanism in a plane spaced from the adjacent end of said journal bearing, such plane extending through said intermediate guiding surfaces, and means for journaling the ends of said screw to enable the latter to co-act with said interlocking mechanism to hold the latter in association with said guiding surfaces.

15. Take-up mechanism comprising the combination with spaced-apart guiding devices each having inner and outer and intermediate guiding surfaces, of a supporting plate having opposite edges slidable along the inner guiding surfaces, a journal bearing, an outer plate secured to said journal bearing and slidable along said outer guiding surfaces, an intermediate plate between said intermediate guiding surfaces, a plurality of spaced-apart bolts for securing together said plates, and means comprising a screw threaded through a nut carried by said intermediate plate for confining the journal bearing for movement along said guiding devices when said screw is rotated.

16. Take-up mechanism comprising the combination with spaced-apart guiding devices each having front and rear guiding surfaces, of a supporting plate having opposite parallel edges slidable along the rear guiding surfaces of said guiding devices, a front plate slidable along the front guiding surfaces of said guiding devices, a journal bearing secured to said front plate, means for securing said plates rigidly together to form with said journal bearing a rigid unit, and mechanism comprising a screw journaled at its ends spaced from opposite sides of said journal bearing for supporting said plates and journal bearing for movement along said guiding devices when said screw is rotated.

17. Take-up mechanism comprising spaced-apart guiding devices, a journal bearing, mechanism for supporting said journal bearing comprising a plate mounted between said guiding devices and supported on the lower guiding device to slide along the same, additional journal bearings spaced from said plate, a screw supported by said additional journal bearings and intermediate its ends threaded through a nut secured to said plate to move bodily therewith to effect movement of the first-named journal bearing along said guiding devices upon rotation of said screw, the latter serving to assist in supporting said plate in predetermined relation to said guiding devices and co-act with the lower guiding device to support the first-named journal bearing and the parts secured thereto, and mechanism for releasably clamping said plate to said guiding devices to hold said journal bearing in adjusted position.

ALEXIS W. LEMMON.